United States Patent [19]  [11] Patent Number: 4,611,379
Heitzman  [45] Date of Patent: Sep. 16, 1986

[54] METHOD OF REMOVABLY SECURING A SECURITY THREADED FASTENER APPARATUS

[75] Inventor: Robert L. Heitzman, Gahanna, Ohio

[73] Assignee: H&E Machine Company, Columbus, Ohio

[21] Appl. No.: 790,752

[22] Filed: Oct. 21, 1985

Related U.S. Application Data

[63] Continuation of Ser. No. 519,067, Aug. 1, 1983, abandoned, and a continuation of Ser. No. 667,203, Nov. 1, 1984, abandoned.

[51] Int. Cl.$^4$ .............................................. B23P 19/00
[52] U.S. Cl. ............................. 29/426.5; 29/526 R; 411/372; 411/373; 411/910
[58] Field of Search ................... 29/526 R, 426.5; 411/371–377, 231, 910, 166, 3, 542, 433, 44; 70/238; 292/307 B

[56] References Cited

U.S. PATENT DOCUMENTS

| 264,776 | 9/1882 | Sharp | 411/372 X |
|---|---|---|---|
| 1,062,000 | 5/1930 | Hahn | 411/433 |
| 1,887,557 | 11/1932 | Keidel | 411/372 X |
| 2,345,949 | 4/1944 | Robbins | 70/232 |
| 3,174,383 | 3/1965 | Heil | 411/910 X |
| 3,425,313 | 2/1969 | Villo | 411/373 |
| 3,711,051 | 1/1973 | Hebdeh | 411/166 X |
| 3,782,146 | 1/1974 | Franke | 70/232 |
| 3,817,065 | 6/1974 | Sander | 70/232 |
| 4,037,515 | 7/1977 | Kesselman | 411/3 |
| 4,065,946 | 1/1978 | Loynes et al. | 70/232 X |
| 4,242,290 | 12/1980 | Handelsman et al. | 411/373 X |
| 4,257,466 | 3/1981 | Eisemann | 411/371 |

FOREIGN PATENT DOCUMENTS

| 657929 | 4/1965 | Belgium | 411/44 |
|---|---|---|---|
| 577,661 | 6/1933 | Fed. Rep. of Germany | 411/542 |
| 673133 | 3/1939 | Fed. Rep. of Germany | 292/307 B |
| 2239146 | 2/1975 | France | 411/378 |
| 819406 | 9/1959 | United Kingdom | 411/177 |
| 2090361 | 7/1982 | United Kingdom | 411/910 |
| 2095356 | 9/1982 | United Kingdom | 411/910 |

Primary Examiner—Charlie T. Moon
Attorney, Agent, or Firm—Francis T. Kremblas, Jr.

[57] ABSTRACT

A tamper-proof or security threaded fastener assembly adapted for use with standard size bolts and screws is provided to reduce or eliminate the unauthorized removal of threaded fasteners from their desired position of fixation. A cap portion is adapted to completely encase the head of the bolt or screw such that, after tightening of the bolt or screw, access thereto is restricted to a special non-standard tool. In one embodiment, a nut portion is provided comprising an elongate strip provided with a threaded hole to receive the bolt and a perpendicularly disposed flange. An additional hole appropriately provided in the base or plate through which the bolt is attached is adapted to receive the flange of the nut portion in a manner which prevents the nut portion from being rotated after the bolt is tightened and fully drawn up to the base or plate.

1 Claim, 9 Drawing Figures

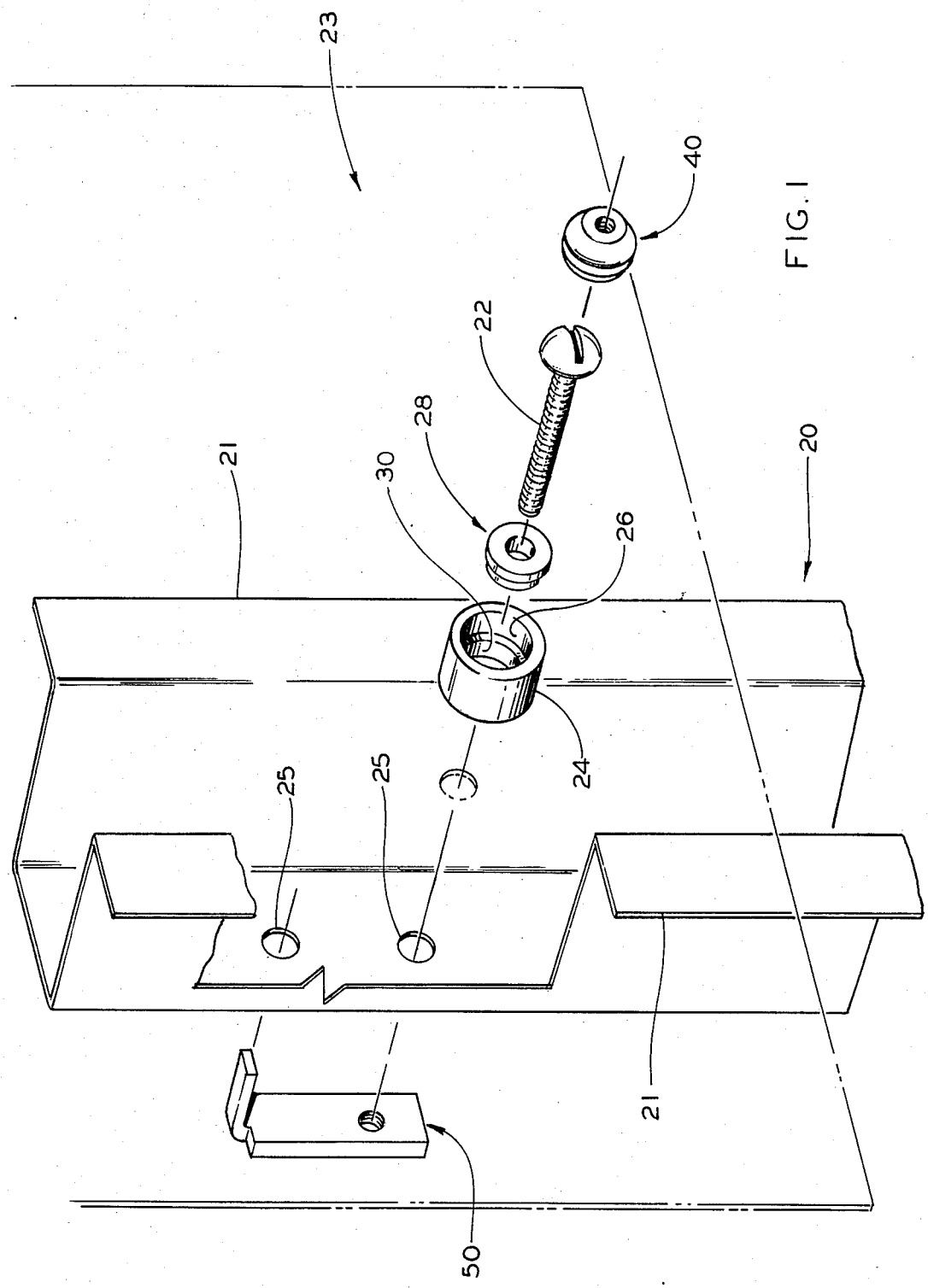

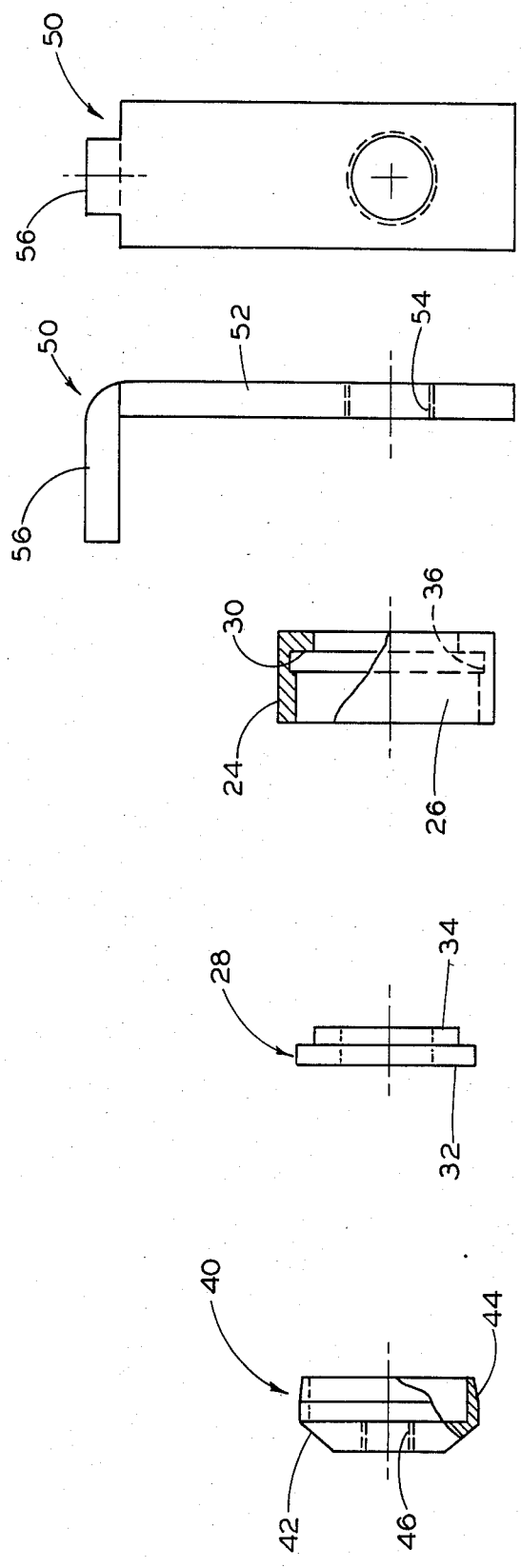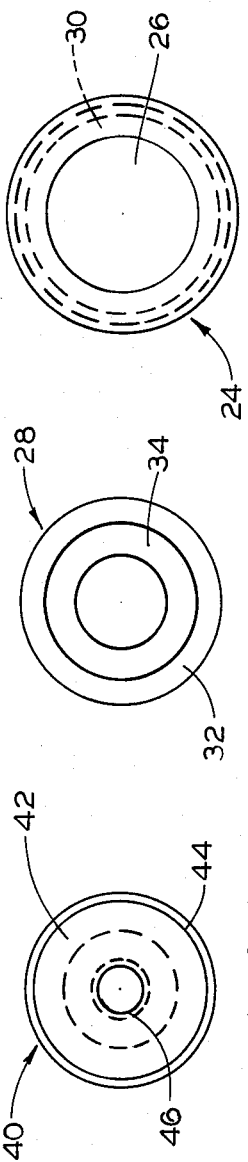

METHOD OF REMOVABLY SECURING A SECURITY THREADED FASTENER APPARATUS

This is a continuation of application Ser. No. 519,067 filed Aug. 1, 1983 and Ser. No. 667,203, filed Nov. 1, 1984, both abandoned.

BACKGROUND

There have been many prior attempts to provide a security or tamper proof threaded fastener assembly which tends to eliminate the unauthorized removal of the fastener from its desired fixed position. These prior attempts include assemblies which provide such protection in varying degrees. However, attempts to provide a higher degree of security, usually results in a system which makes it very difficult and sometimes impossible for the authorized removal of such fasteners.

There are many applications wherein public or private signs, equipment boxes, or other devices are readily available to the public and to more or less casual type tampering. One example is the removal of various state and city traffic signs, such as signs indicating motorists to stop, or those providing information such as speed limits, and bumps or curves in the road. The expense of such signs is substantial. A rather long existing fad, particularly among young persons, involves a relatively casual theft of such signs and represents a very significant government expense for replacement, not to mention the inherent danger to motorists prior to the replacement of a given warning or informational sign.

Therefore there has been a long and well-recognized need for a good security type threaded fastener system which provides a high degree of protection from particularly relatively casual tampering and yet allows authorized removal in a reasonably easy and simple fashion. A satisfactory security assembly of this type which overcomes many of the disadvantages present in the prior art has not been found prior to the present invention.

SUMMARY OF INVENTION

A tamper proof or security type threaded fastener assembly which tends to eliminate unauthorized removal of the fastener from the device in which it has been afixed. The cap portion includes a generally cylindrical body portion through which a standard size bolt or screw is recevied the interior of the body is provided with a lip portion which reduces the diameter of the central opening to permit the threaded shank of the bolt to pass, yet stops the head portion at a predetermined depth within the body. The nut portion comprises an elongate metal strip provided with a suitable threaded hole to receive the bolt and a perpendicularly extending flange adapted to be placed in a hole provided in the device to restrict rotation of the nut portion.

After the bolt is tightened in position on the nut, a plug is provided which is press fit into the recess in the body to enclose the head of the bolt. The only access to the head of the bolt is through a small threaded hole in the plug portion through which a special threaded tool may be inserted to unseat the plug and thereby expose the head of the bolt to authorized personnel for removal using a conventional screw driver or the like.

OBJECTS

It is therefore an object of the present invention to provide a security assembly adapted for use with standard threaded fasteners which provides a high degree of protection from casual type tampering and yet is relatively easy to install and to remove by authorized personnel.

It is another object of the present invention to provide a device of the type described wherein only standard, readily available and commonly used tools are necessary to install the security assembly and a very simple and inexpensive tool, not readily available to the potential tamperer, is required to provide authorized removal.

It is another object of the present invention to provide a device of the type described which is relatively simple to manufacture in volume at reasonable unit cost.

It is a further object of the present invention to provide a device of the type described wherein, in many applications, the assembly of a standard bolt in conjunction with the cap and nut of the present invention in its desired fixed position may be accomplished in a very easy and time efficient manner and which requires no special skills or training for personnel ordinarily employed to do such work.

Further objects and advantages of the present invention will be apparent from the following description, reference being had to the accompanying drawings wherein a preferred embodiment of the invention is clearly shown.

IN THE DRAWINGS

FIG. 1 is a perspective view of a security cap and nut assembly for a standard threaded fastener constructed in accordance with the present invention and illustrated in exploded relationship;

FIG. 2 is a top plan view of the plug of the cap comprising a portion of the present invention and shown in FIG. 1;

FIG. 3 is a side elevational view partially in section of the plug shown in FIG. 1;

FIG. 4 is a top plan view of the insert comprising a portion of the cap shown in FIG. 1;

FIG. 5 is a side elevational view of the insert shown in FIG. 4;

FIG. 6 is a top plan view of the main body portion of the cap shown in FIG. 1;

FIG. 7 is a side elevational view partially in section of the main body portion of the cap shown in FIG. 6;

FIG. 8 is a side elevational view of the nut portion of the present invention shown in FIG. 1; and FIG. 9 is a front elevational view of the nut portion shown in FIG. 8.

DETAILED DESCRIPTION

A security threaded fastener assembly constructed in accordance with the present invention is shown in FIG. 1 in exploded relationship.

Merely for purposes of illustration, a mounting bracket on a typical sign post is indicated generally at 20.

However, the basic concept and principle of the present invention would apply to many other applications wherein a threaded fastener is used to mount one item to another.

The security fastener assembly of the present invention includes a standard threaded fastener in the form of a bolt 22 having a threaded shank and an enlarged head provided with a screw driver slot.

A security cap portion is provided which includes a generally cylindrical body portion 24 provided with a central bore 26. The dimensions of bore 26 depend upon the standard size of the bolt 22 and is large enough to accomodate the head of the bolt. An insert portion indicated generally at 28, is provided and is seated on a lip portion 30, FIG. 7. The annular lip reduces the diameter of central bore 26 to a degree which permits the head of bolt 22 to be inserted to a predetermined depth within bore 26.

Insert 28 preferably is made of a plastic material, such as nylon for example, and includes an annular upper flange or rim 32 which surrounds a through hole 33 and an annular extension 34 having a smaller outside diameter than flange 32. It is desirable that the annular flange portion 32 have a slightly larger outer diameter compared to bore 26 such that insert 28 forms a press fit with bore 26. Further an annular recess 36 may be provided in the interior walls of bore 26 such that a portion of annular rim 32 may be received therein and rest upon lip 30 formed in bore 26. This feature is not totally essential to the security of the system, however, it is a desirable feature for assembly purposes in that the insert can be assembled into the body and is locked in place to inhibit displacement thereof during later handling or shipping. Further, it provides one less chore to the user in the field as the insert is already pre-assembled within the body 26.

Annular extension 34 extends downwardly through the reduced diameter portion of bore 26 and preferably extends outwardly from the bottom of body 24 a few thousandths of an inch. This small outward protrusion of annular extension 34 then functions to maintain a slight clearance between body 24 and the surface of the object such as 23, when bolt 22 is fully drawn tight.

In this configuration, bolt 22 bears upon the upper rim of insert 28, therefore there is no metal to metal contact between the object 23, the head of bolt 22 or the main body portion 24.

With reference to FIGS. 1, 2 and 3, a plug indicated generally at 40 is provided which includes a relatively thick dome portion 42 and an annular rim 44. Dome portion 42 is provided with a threaded bore 46 and approximately the lower half of rim 44 includes an inwardly tapered section.

Bore 46 is relatively much smaller than the largest annular dimension of rim 44 which itself is slightly larger in diameter compared to the upper portion of bore 26 in body 24 to ensure a good press fit. The tapered lower half of rim 44 is provided to aid insertion of plug 40 into bore 26. The dimensions of bore 26 and plug 40 are designed such that it may be inserted in a press fit relationship with a conventional hammer or the like in a relatively easy fashion.

The diameter of threaded bore 46 is designed small enough relative to the head of bolt 22 such that any screw driver or the like which could be inserted through bore 46 would be too small to exert sufficient torque upon the head of the bolt to successfully loosen it.

To provide reasonable security the diameter of threaded bore 46 can be approximately one-fourth as large as the head of the threaded fastener used.

Bore 46 preferably is provided with non-standard left-handed threads which can be mated to a special tool for authorized removal of plug 40.

The lower limit of the diameter of bore 46 would be practically defined when the diameter of the threaded portion of a tool adapted to mate with the threads of bore 46 is so small that failure of the shank is likely from the torque required to remove press-fit plug 40.

Now referring to FIGS. 8 and 9, a nut portion, indicated generally at 50, is provided for certain applications in which the base or sub plate is not provided with a threaded hole. Nut portion 50 includes an elongate metal strip 52 provided with a threaded hole 54 adapted to receive a standard bolt such as 22.

An integrally formed flange 56 extending substantially perpendicular to strip 52 may be provided and is adapted to fit into a hole which is provided in the mounting base or plate to which the bolt is to be attached in applications wherein rotation of the nut portion is not desirable for security purposes or for ease of installing the threaded fastener.

However, a conventional nut could advantageously be used in most applications without significant impairment of the security function. It is particularly recommended that the shank of the fastener used in applications requiring a nut be only as long as necessary to extend beyond the nut sufficiently to permit the fastener to be drawn tightly in the installed configuration. Then any attempts to remove the fastener by manipulation of the end of the fastener and the nut will be made much more difficult and tend to frustrate such efforts.

For purposes of description, use of the security cap and nut assembly as applied to traffic sign applications will be described. A portion of a typical traffic sign mounting post is illustrated and indicated generally at 20. A pair of brackets 21 form a backing surface upon which a sign, indicated generally at 23 is to be mounted, Such posts are standard and are usually provided with a plurality of holes, such as 25, spaced approximately one inch apart to permit the sign to be mounted at various vertical locations upon the post coordinated with the location of the backing brackets 21.

To use the present invention, one first inserts bolt 22 through bore 26 of body 24. The shank of bolt 22 extending outwardly through body 24 is then extended through a hole provided in sign 23 and through one of the holes 25 in post 20. As described herein, bolt 22 is extended through the lower hole 25 as shown. The nut portion 50 is held in position on the opposite side of post 20 with threaded hole 54 aligned with bolt 22 and flange 56 aligned with the upper hole 25. Applying finger pressure to initially thread bolt 22 into hole 54 and inserting flange 56 into the upper hole 25, the user then proceeds to draw the bolt 22 tight using a conventional screw driver extended through the outwardly facing opening in body 24.

Since flange 56 is inserted into the hole 25, nut portion 50 cannot be rotated so the tightening process is relatively simple. As the bolt 22 is drawn tight, it should be pointed out that the head of bolt 22 will be drawn tight against the upper rim portion of insert 28. Since bore 26 is designed to readily accomodate the head of bolt 22, there is no direct engaging contact between the interior walls of bore 26 and the head of bolt 22.

Upon final tightening of bolt 22, the head portion is drawn tight upon the upper rim 32 of insert 28 and the annular extension 34 which protrudes slightly from the bottom of body 24 is drawn tight against the surface of sign 23. Therefore there is no metal to metal contact between body 24 and the surface of sign 23 or the bolt 22.

Once the bolt is drawn tight, plug 40 is aligned with the outward opening of bore 26 and may be inserted by tapping with a hammer or the like to become firmly seated in press fit relationship with bore 26. Once this assembly is completed, it should be readily understood that any attempt at casual tampering to remove bolt 22 is effectively neutralized. The head of bolt 22 is completely enclosed within body 24 and under press fit plug 40. Nut portion 50 is drawn tightly against the back surface of post 20 and cannot be rotated because flange 56 is inserted into hole 25.

If one should attempt to use a wrench or vice-grips to turn body 24, body 24 will rotate, however, no appreciable torque will be applied upon the head of bolt 22 because there is insufficient friction between insert 28 and body 24 to apply any significant degree of torque to the head of bolt 22.

It is pointed out that there is no bearing surface between body 24 and bolt 22 or sign 23, which does not have a surface of nylon insert 28 disposed therebetween.

It should be noted however, that even without using the specific form of insert 28 as described herein, the bolt 22 is reasonably secure from many forms of casual tampering since in many instances merely preventing screw driver access to the head of the bolt frustrates attempted theft. Further, applying torque upon body 24, even without nylon insert such as 28, may not be sufficient to adequately rotate the head of bolt 22 to remove the bolt without requiring much greater effort or preparation than many would-be tamperers are willing to expend.

Also, it should be pointed out that when a non-metallic bearing surface is desirable in a given application, other forms of an insert in place of insert 28 may be effectively employed.

For example, a cylindrical collar-type insert of appropriate dimensions may be used. The threaded shank would be passed through such a cylindrical collar prior to passing through the sign or other object. The upper end of the collar would then bear against the bottom surface of the head of the fastener and the lower end of the collar would extend slightly from the bottom of body 24 to abut against the surface of the sign or other object being attached by means of the fastener. Proper dimensioning of the length of such a collar would preclude any significant longitudinal movement of body 24 relative to threaded fastener 22 with lip 30 acting as a stop means upon fully tightening of the fasteners.

For authorized removal and reusing the bolt and security cap and nut of the present invention, the authorized personnel will be provided with a threaded tool adapted to mate with the left-hand threads of bore 46. Inserting such a tool into bore 46 and threading it into the bore until the head of bolt 22 is engaged exerts an outwardly directed force upon plug 40. Continuing the threading process eventually forces plug 40 out of bore 26 to provide access to the head of bolt 22. Then bolt 22 may be loosened in a conventional manner and reused with the security cap and nut as needed.

From the foregoing description, it should be readily apparent that an improved security cap and nut assembly for use with standard bolts or screws is provided which can be easily installed using standard and commonly used tools.

Further, such assembly is capable of being reused via removal of the plug portion in a simple and easy manner using a non-conventional tool not readily available to the public.

Additionally, it should be easily appreciated to those skilled in the art that the security cap portion including body 24 and plug 40 would serve equally as well to provide security against tampering for applications involving fasteners threaded into holes in which a nut portion is not required.

What is claimed is:

1. A method of removably mounting a sign or other planar object to a conventional mounting bracket or post in a secure disposition resisting unauthorized removal using standard implements comprising the steps of inserting a conventional threaded bolt having an enlarged head and an elongate threaded shank through a central bore of a generally cylindrical cap member wherein the head of said bolt is disposed below the upper rim of said cap member and against a retaining lip provided near the opposing end of said central bore and the end portion of the threaded shank extends beyond said cap member; inserting the end portion of said threaded shank through a hole provided in said sign and a hole provided in a mounting bracket adapted to support said sign; aligning a nut member with the end of said threaded shank with said nut member being fixed against rotation and rotating said enlarged head to thread said shank into and through said nut member to a position drawing said head portion in tight force-transmitting engagement with said inner lip portion of said cap member; placing a plug member having a vertically centrally disposed threaded bore with a diameter of approximately one-fourth or less of the diameter of said enlarged head of said bolt into said central bore of said cap member in force-fit relationship therein to limit access to said enlarged head; and remove said plug from said cap by rotatably inserting a threaded tool into said threaded bore and against said enlarged head to force said plug out of said central bore without rendering said bolt, said cap member or said plug unusable for similar re-use.

* * * * *